No. 660,870. Patented Oct. 30, 1900.
F. SINKOVIC.
BOB LEVEL.
(Application filed May 4, 1900.)
(No Model.)

Witnesses:
T. D. McMahon.
J. Buehler.

Inventor,
Ferdinand Sinkovic
by B. Singer
Att'y.

United States Patent Office.

FERDINAND SINKOVIC, OF KLAUSENLEOPOLDSDORF, AUSTRIA-HUNGARY.

BOB-LEVEL.

SPECIFICATION forming part of Letters Patent No. 660,870, dated October 30, 1900.

Application filed May 4, 1900. Serial No. 15,448. (No model.)

*To all whom it may concern:*

Be it known that I, FERDINAND SINKOVIC, a subject of the Emperor of Austria-Hungary, and a resident of Klausenleopoldsdorf, Austria-Hungary, have invented certain new and useful Improvements in Bob-Levels, of which the following is a specification.

My present invention relates to certain improvements in bob-levels, the object being to provide an improved instrument of this kind simple in construction and most accurate in operation.

The invention consists of a straight rule, to which a flexible isosceles triangle and a weight are attached, the leading feature of the improved instrument being that the base-line of the triangle is in a horizontal position when a bob attached to the middle point of the base-line runs through or bisects the apex of the triangle. In my improved instrument the base of the triangle is formed of a straight rule, while the sides of the triangle are formed of a cord, the two ends of which are attached to the rule and which carries a weight at its middle point. The bob is attached to the middle point of the base.

In order that the invention may be properly understood and carried into practical effect, reference is hereby made to the accompanying drawings, illustrating the invention, in which—

Figure 1:
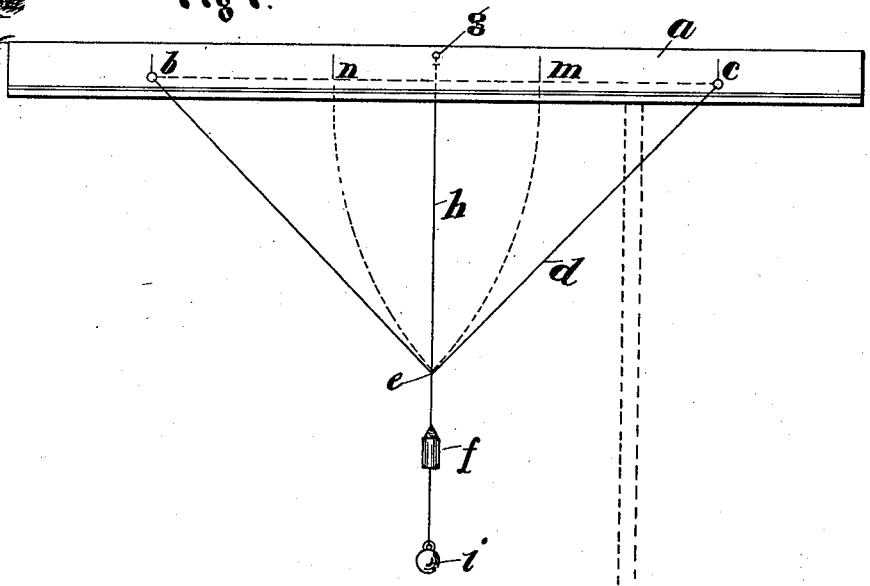
Figure 2:
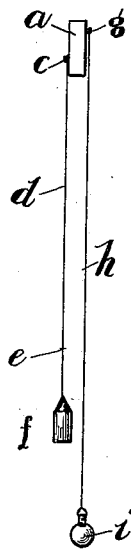

Figure 1 is a side elevation, and Fig. 2 an end view, of apparatus embodying my invention in position for effective use.

Referring to the drawings, $a$ represents the rule, to which is attached at the points $b$ and $c$ a cord $d$, provided at its middle point $e$ with a weight $f$, fixedly attached thereto. At the point $g$, middle point of the line $b\,c$, is attached the cord or thread $h$, provided with a weight $i$, constituting the bob of the apparatus, which when the rule is in an exactly horizontal position coincides with the perpendicular from the base bisecting the angle formed between the cord portions $b\,e$ and $c\,e$. In order to facilitate corrections in the length of the cord portions and in the adjustment of the weight $f$, the rule will be provided with marks $m\,n$, arranged so that the distance between $m\,b$ is equal to the distance between $b\,e$ and that the distance between $n\,c$ is equal to $c\,e - b\,e$. Thus when the cord is stretched over the rule the operator may easily verify if the weight $f$ is exactly attached to the middle point of the cord $d$. In order that the plumb-line may clear the weight $f$, it will be attached to the rule somewhat to one side of the plane of the triangle, preserving, however, the central relation to the points $b$ and $c$ of said triangle—that is, the flexible cord $d$ may be attached at said points $b\,c$ on one side of the rule and the plumb-line at the point $g$ on the other side of the rule, where the thickness of the rule is not inordinately great.

In operation I employ with the bob-level a supporting-post (indicated in dotted lines, Fig. 1) and one or more staffs and sight the leveling-rule when it is adjusted to a horizontal position, which is ascertained by the bisecting of the apex of the triangle by the plumb-line.

It will be seen that my invention provides a simple, effective, and accurate device of easy manipulation, whereby leveling may readily be effected.

Having thus described my invention, what I claim, and desire to secure by Letters Patent, is—

1. The combination, to form a bob-level, of a straight rigid rule, a flexible cord having its ends attached to two distinct points on said rule, a suitable weight attached to the middle point of said cord so that the latter and the rigid rule form an isosceles triangle, and a plumb-line attached to the rule at a point equidistant from the points where the cord is attached and carrying a bob at its free end.

2. The combination with the rigid rule, flexible cord and weight and with the plumb-line and bob, of fixed marks $n$ and $m$ arranged upon the rule in the described relation to the points of attachment of the cord.

In testimony whereof I have hereunto set my hand in presence of two witnesses.

FERDINAND SINKOVIC.

Witnesses:
 ALVESTO S. HOGUE,
 AUGUST TUGGER.